United States Patent [19]

Pauwels

[11] 4,175,794
[45] Nov. 27, 1979

[54] MODULATOR VALVE FOR A SPINNING AND SKIDDING WHEEL ASSEMBLY

[75] Inventor: Edward M. Pauwels, South Bend, Ind.

[73] Assignee: The Bendix Corporation, Southfield, Mich.

[21] Appl. No.: 901,405

[22] Filed: May 1, 1978

[51] Int. Cl.² .............................................. B60T 8/08
[52] U.S. Cl. ................................... 303/105; 303/119
[58] Field of Search ............... 303/100, 105, 110, 115, 303/119

[56] References Cited

U.S. PATENT DOCUMENTS

| | | | |
|---|---|---|---|
| 2,256,287 | 9/1941 | McCune | 303/110 |
| 3,556,610 | 1/1971 | Leiber | 303/105 |
| 3,671,082 | 6/1972 | Stevens | 303/119 |
| 3,674,320 | 7/1972 | Howard et al. | 303/105 |
| 4,077,675 | 3/1978 | Leiber et al. | 303/110 X |

*Primary Examiner*—Duane A. Reger
*Attorney, Agent, or Firm*—Paul David Schoenle; Ken C. Decker

[57] ABSTRACT

A brake system includes a master cylinder which is operable to communicate pressurized fluid to a wheel assembly in order to brake the latter. The wheel assembly is capable of spinning or skidding under excessive acceleration or deceleration, respectively, and an electronic control unit cooperates with a modulator valve and a pressure source to compensate for spinning or skidding by controlling the communication of pressurized fluid from the modulator valve to the wheel assembly. The modulator valve communicates with the pressure source and the master cylinder and includes a first bore for slidably supporting a piston assembly and a second bore for slidably supporting a plunger. The piston assembly cooperates with a modulator valve housing to define a storage chamber and the pressure source is operable to move the plunger to a position communicating the master cylinder and the wheel assembly with the storage chamber. The piston assembly comprises at least three pistons, two of which define pressure chambers and the third defines the storage chamber. At least two solenoid valves are coupled to the control unit so that one of the solenoid valves is actuated upon skidding to vent one of the pressure chambers and the other solenoid valve is actuated upon spinning to vent the other pressure chamber. A first piston includes a projection extending through a bore in the second piston to oppose a third piston.

10 Claims, 1 Drawing Figure

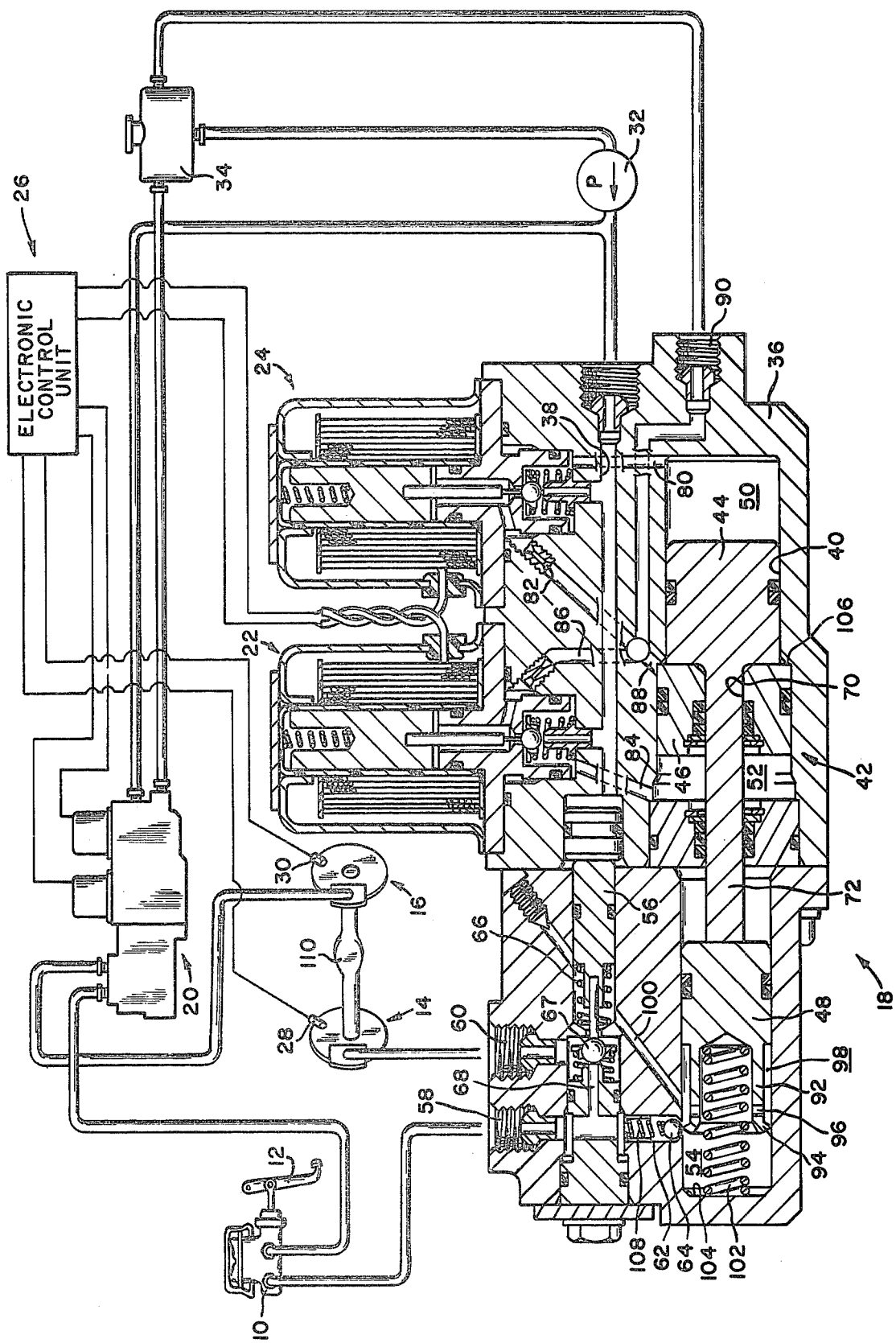

MODULATOR VALVE FOR A SPINNING AND SKIDDING WHEEL ASSEMBLY

BACKGROUND OF THE INVENTION

It is known that brake pressure communicated to a wheel assembly can be relieved during a braking application to control a skidding condition for the wheel assembly. In addition, with a pair of driving wheels it is possible to communicate pressurized fluid to one of the pair of wheel assemblies which is spinning in order to transfer driving torque to the other driving wheel via a differential between the pair of driving wheels. In order to compensate for skidding and spinning, an electronic control unit generally cooperates with a modulator valve to control communication of pressurized fluid to the wheel assembly. As the modulator valve operates during braking, skidding and spinning to control communication of pressurized fluid to the wheel assembly, it is desirable to provide a modulator valve which is simple in structure, yet compactly arranged to control communication from a fluid pressure generator to a wheel assembly.

SUMMARY OF THE INVENTION

The present invention provides a modulator valve which communicates with a fluid pressure generator and a pressure source to control fluid communication to a wheel assembly in response to braking, skidding or spinning of the wheel assembly. The modulator valve includes a pair of solenoid valves and forms a pair of bores for receiving a piston assembly in one bore and a plunger in the other bore. The piston assembly comprises a first piston and a second piston defining a pair of pressure chambers and a third piston defining a storage chamber. The storage chamber communicates with the fluid pressure generator and with the wheel cylinder when the plunger is exposed to pressurized fluid from the pressure source.

With the pressure source in operation, a braking application communicates pressurized fluid through the storage chamber to the wheel assembly to brake the latter. If the wheel assembly begins to skid due to excessive braking or a slippery road surface, an electronic control unit activates one of the pair of solenoid valves to vent one of the pressure chambers, thereby moving the first piston and the third piston in one direction. Movement of the third piston in one direction closes a check valve to separate the wheel assembly from the fluid pressure generator and expands the storage chamber to receive a portion of the pressurized fluid within the wheel assembly, so that the pressure of pressurized fluid communicated to the wheel assembly is reduced to avoid skidding. If the wheel assembly begins to spin during acceleration, the elctronic control unit activates the other solenoid valve to vent the other pressure chamber, thereby moving the first, second, and third pistons in an opposite direction. Movement of the third piston in the opposite direction closes the check valve to trap fluid within the storage chamber and contracts the storage chamber to pressurize the fluid therein, thereby communicating the trapped pressurized fluid to the spinning wheel assembly to brake the spinning wheel assembly. By braking the spinning wheel assembly, the driving torque originally transmitted to the spinning wheel assembly is redirected to a non-spinning wheel assembly.

In particular, the second piston includes a bore for receiving a portion of the first piston and the portion of the first piston extends through the second piston bore to engage the third piston.

BRIEF DESCRIPTION OF THE DRAWING

The sole FIGURE represents a schematic of a brake system including a modulator valve constructed in accordance with the present invention.

DETAILED DESCRIPTION

In the brake system of the sole FIGURE a fluid pressure generator 10, such as a master cylinder, is coupled to a brake pedal 12 and is in communication with a pair of wheel assemblies 14 and 16 by way of modulator valves 18 and 20. As both modulator valves are identical, the description will proceed with reference to only modulator valve 18; however, the features herein are equally applicable to modulator valve 20.

The modulator valve 18 includes a pair of solenoid valves 22 and 24 which are activated in response to an electronic control unit 26. The electronic control unit 26 monitors the wheel speed of the wheel assemblies 14 and 16 by means of wheel speed sensors 28 and 30, respectively. In addition, the modulator valve 18 communicates with a pressure source 32 and a reservoir 34.

In accordance with the invention, the modulator valve 18 includes a housing 36 which supports the pair of solenoid valves 22 and 24 and forms a bore 38 communicating with the pressure source 32 and a bore 40. The bore 40 movably supports a piston assembly 42 comprising a first piston 44, a second piston 46 and a third piston 48. The first piston 44 cooperates with the bore 40 to define a pressure chamber 50 and the second piston 46 cooperates with the bore 40 to define a pressure chamber 52, while the third piston 48 cooperates with the bore 40 to define a storage chamber 54. The second piston 46 includes a bore 70 through which a projecting portion 72 of the first piston 44 extends to engage the third piston 48.

The inlet 58 leads to a connecting passage 62 which receives a check valve 64. In the position illustrated, the check valve 64 is engageable with the third piston 48 to open the storage chamber 54 to the connecting passage 62 and the inlet 58. Moreover, pressurized fluid from the pressure source 32 is received in the bore 38 to bias a plunger 56 against a spring 66 to open the storage chamber 54 to the outlet 60 via safety valve 67 and to close direct communication between the inlet 58 and the outlet 60 via a bypass passage 68.

In the position illustrated the solenoid valve 24 communicates pressurized fluid from the bore 38 to the pressure chamber 50 via passage 80 and closes the return passage 82. The solenoid valve 22 communicates pressurized fluid from the bore 38 to the pressure chamber 52 via passage 84 and closes the return passage 86. A return passage 88 communicates with the face of piston 46 opposite pressure chamber 52 and connects with return passages 82 to communicate with a return port 90 for communicating with the reservoir 34.

The thrid piston 48 includes an axially extending boss 92 of smaller diameter than the third piston 48. The axially extending boss 92 terminates in a radial flange 94 which cooperates with the check valve 64 to maintain the latter in an open position when the radial flange 94 is in alignment with the connecting passage 62. In addition, a plurality of apertures 96 extend through the boss 92 to communicate the storage chamber 54 with the space 98, between the bore 40 and the boss 92, which communicates via passage 100 with the safety valve 67. A spring 102 extends between the end wall 104 of bore 40 and the piston 48 to bias the piston 48 to a position expanding the storage chamber 54.

MODE OF OPERATION

Before the pressure source 32 is in operation, a braking application of the pedal 12 communicates pressurized fluid from the master cylinder 10 to the inlet 58 wherein pressurized fluid flows through the bypass passage 68 and out the outlet 60 to communicate pressurized fluid to the wheel assembly 14. In a similar manner pressurized fluid communicates with the modulator valve 20 and the wheel assembly 16. When the pressure source 32 is in operation, for example, when an engine of a motor vehicle is running to operate a power steering pump, pressurized fluid from the pressure source 32 is communicated to the bore 38 to equally pressurize pressure chambers 50 and 52 and bias the plunger 56 to the left to close the bypass passage 68 via valve 67. With pressurized fluid communicated to pressure chamber 50 and 52, the second piston 46 is biased against a shoulder 106 and the first piston 44 is biased against the second piston 46 to position the third piston 48 such that the radial flange 94 opposes the check valve 64 to open the connecting passage 62 to the storage chamber 54. Consequently, during a braking application pressurized fluid is communicated to the wheel assembly 14 via inlet 58, connecting passage 62, storage chamber 54, aperture 96, space 98, passage 100, safety valve 67 and outlet 60.

If excessive brake forces or a slippery road surface causes an imminent skidding condition to occur for the wheel assembly 14, the electronic control unit senses this condition via the wheel speed sensor 28 and activates the solenoid valve 24. The activated solenoid valve 24 closes communication between the bore 38 and the passage 80 while simultaneously opening the latter to the return passage 82 to vent the pressure chamber 50. The vented pressure chamber 50 permits the first piston 44 and the third piston 48 to move to the right under the force of spring 102 and pressurized fluid within the storage chamber 54. The movement of piston 48 separates the flange 94 from the check valve 64 thereby enabling a spring 108 to urge the check valve 64 to a position closing the connecting passage 62 to the storage chamber 54. Further movement of the piston 48 causes the storage chamber 54 to expand to receive pressurized fluid from the wheel assembly 14 via outlet 60, passage 100 and apertures 96. Consequently, the braking pressure at the imminent skidding wheel assembly 14 is reduced to avoid a skidding condition. Once skidding is no longer imminent, the electronic control unit deactivates the solenoid valve 24 to return the first piston 44 and the third piston 48 to the position illustrated in the drawing, so that continued braking will communicate pressurized fluid to the wheel assembly via the storage chamber 54.

During acceleration, it is possible for the wheel assembly 14 to lose traction with a road surface and spin as a result of excessive torque being transmitted to the wheel assembly or because of a slippery road surface. When the wheel assembly 14 accelerates at a rate of speed above a predetermined value, the electronic control unit senses the above-normal acceleration of the wheel assembly 14 via wheel speed sensor 28 and operates to activate solenoid valve 22. The activated solenoid valve 22 closes the bore 38 to the pressure chamber 52 and opens the latter to the return port 90 via return passage 86. Consequently, pressurized fluid is communicated to the reservoir 34 from the pressure chamber 52, so that the pressurized fluid communicated to the pressure chamber 50 causes the first piston 44, the second piston 46 and the third piston 48 to move toward the end wall 104. As the third piston 48 is moved in this direction, the flange 94 separates from the check valve 64 to close the connecting passage 62. Further movement of the third piston 48 toward the end wall 104 contracts the storage chamber 54 to pressurize trapped fluid therein and communicate the pressurized trapped fluid to the spinning wheel asseambly 14. Therefore, the spinning wheel assembly 14 is braked to offset the spinning of the wheel. If the wheel assembly 14 is coupled to the wheel assembly 16 by means of a differential 110, the braking of the spinning wheel assembly 14 causes the driving torque to be transferred via the differential 110 to the wheel assembly 16. When the spinning condition is no longer evident in the wheel assembly 14, the electronic control unit senses the lack of spinning and deactivates the solenoid valve 22 to return the first, second and third pistons to the position illustrated in the drawing.

From the foregoing description it is evident that the modulator valve 18 provides for the communication of pressurized fluid from the master cylinder 10 to the wheel assembly and the control unit 26 cooperates with the modulator valve and the pressure source 32 to relieve braking pressure at the wheel assembly during skidding and to communicate pressurized fluid to the wheel assembly during spinning.

Although the sole FIGURE illustrates a hydraulic braking system, it is possible to utilize the same concepts herein in conjunction with a vacuum source to control spinning and skidding in a pneumatic braking system. With such a system, the piston assembly would be replaced by diaphragms to contract and expand a variable volume storage chamber.

Many modifications and/or additions are possible by one skilled in the art and it is intended to include these modifications and/or additions in the scope of the appended claims.

I claim:

1. In a brake system having a fluid pressure generator communicating pressurized fluid to a rotatable wheel assembly, a control unit responsive to the speed of rotation of the wheel assembly, a modulator valve controlling fluid communication between the fluid pressure generator and the wheel assembly and a pressure source communicating with the modulator valve, the improvement wherein the modulator valve comprises a housing having at least one bore and a piston assembly is slidably mounted in the one bore to substantially define a pair of pressure chambers the control unit cooperating with the modulator valve to vent one of said pair of pressure chambers when a skidding condition exists for the wheel assembly and the control unit cooperating with the modulator valve to vent said other pressure chamber when a spinning condition exists for the wheel assembly.

2. The brake system of claim 1 in which said piston assembly comprises a first piston and a second piston, said second piston having a bore therethrough and said first piston extends through said second piston bore.

3. The brake system of claim 2 in which said piston assembly includes a third piston slidably mounted in the housing bore to substantially define a storage chamber which communicates with the fluid pressure generator and the wheel assembly and said first piston is engageable with said third piston.

4. The brake system of claim 2 in which said first piston and said second piston move relative to the modulator valve housing when said other pressure chamber is vented and said first piston moves relative to the modulator valve housing when said one pressure chamber is vented.

5. In a brake system having a fluid pressure generator communicating pressurized fluid to a rotatable wheel assembly, a control unit responsive to the speed of rotation of the wheel assembly, a modulator valve controlling fluid communication between the fluid pressure generator and the wheel assembly, and a pressure source communicating with the wheel assembly, the improvement wherein the modulator valve comprises a housing having at least two bores therein, a piston assembly slidably mounted in one of the bores and a plunger slidably mounted in the other bore, said piston assembly cooperating with the one bore to define a storage chamber, the pressure source being operable to move said piston assembly to a position providing for communication between the fluid pressure generator and the storage chamber and the pressure source also cooperating with said plunger to provide for communication between the storage chamber and the wheel assembly, when the pressure source is operable, and said plunger communicating the fluid pressure generator with the wheel assembly independently of the storage chamber when the pressure source is inoperable.

6. The brake system of claim 5 in which a check valve is disposed between the fluid pressure generator and the storage chamber, said piston assembly being engageable with said check valve to maintain the latter open, and said piston assembly being movable to close said check valve.

7. In a brake system for a wheel assembly which is subjected to skidding and spinning conditions, a modulator valve comprising a housing slidably supporting a piston assembly and a pair of solenoid valves, said piston assembly cooperating with said housing to substantially define a variable volume storage chamber communicating with the wheel assembly, one of said solenoid valves being actuated upon a skidding condition and cooperating with said piston assembly to increase the volume of the storage chamber and the other of said solenoid valves being actuated upon a spinning condition and cooperating with said piston assembly to decrease the volume of the storage chamber, said piston assembly including a plurality of pistons and at least two of said plurality of pistons are movable in response to one of said skidding and spinning conditions.

8. A modulator valve comprising:
a housing having at least one bore;
a piston assembly slidably disposed within the one bore; and
at least two solenoid valves cooperating with said piston assembly to control the position of said piston assembly within said housing bore;
said piston assembly including a plurality of pistons, a pair of said plurality of pistons cooperating with said housing to substantially define a pair of pressure chambers, each pressure chamber communicating with one of the two solenoid valves and one of said pair of pistons being movable in response to fluid pressure within one of said pressure chambers.

9. A modulator valve comprising:
a housing having at least one bore;
a piston assembly slidably disposed within the one bore; and
at least two solenoid valves cooperating with said piston assembly to control the position of said piston assembly within said housing bore;
said piston assembly including a plurality of pistons, a pair of said plurality of pistons substantially defining pressure chambers, each pressure chamber communicating with one of the two solenoid valves;
one of said pair of pistons including a bore therethrough and the other of said pair of pistons extending through the bore to oppose another of the plurality of pistons.

10. A modulator valve comprising:
a housing having at least one bore;
a piston assembly slidably disposed within the one bore; and
at least two solenoid valves cooperating with said piston assembly to control the position of said piston assembly within said housing bore;
said piston assembly including a plurality of pistons, a pair of said plurality of pistons substantially defining pressure chambers, each pressure chamber communicating with one of the two solenoid valves;
each of said two solenoid valves being actuated separately to vent the corresponding pressure chamber communicating with each solenoid valve, one of said pair of pistons being movable in response to fluid pressure within one of said pressure chambers.

* * * * *